United States Patent
Blaunstein

(10) Patent No.: US 11,822,028 B2
(45) Date of Patent: Nov. 21, 2023

(54) METHOD FOR SHORT-TERM PREDICTION OF EARTHQUAKE PARAMETERS USING IONOSPHERIC PRECURSORS

(71) Applicant: IONOTERRA Ltd., Ramat Gan (IL)

(72) Inventor: Nathan Blaunstein, Beer Sheba (IL)

(73) Assignee: IONOTERRA LTD., Ramat Gan (IL)

( * ) Notice: Subject to any disclaimer, the term of this patent is extended or adjusted under 35 U.S.C. 154(b) by 0 days.

(21) Appl. No.: 17/720,425

(22) Filed: Apr. 14, 2022

(65) Prior Publication Data

US 2023/0258836 A1     Aug. 17, 2023

Related U.S. Application Data

(60) Provisional application No. 63/176,422, filed on Apr. 19, 2021.

(51) Int. Cl.
*G01V 1/00* (2006.01)
*G01V 1/30* (2006.01)
*G01V 1/22* (2006.01)

(52) U.S. Cl.
CPC .............. *G01V 1/008* (2013.01); *G01V 1/223* (2013.01); *G01V 1/305* (2013.01); *G01V 1/307* (2013.01)

(58) Field of Classification Search
CPC ........ G01V 1/008; G01V 1/223; G01V 1/305; G01V 1/307
See application file for complete search history.

(56) References Cited

U.S. PATENT DOCUMENTS

| | | | | |
|---|---|---|---|---|
| 6,246,964 B1* | 6/2001 | Blaunstein | ............... | G01V 3/12 702/15 |
| 7,277,797 B1* | 10/2007 | Kunitsyn | ............... | G01V 1/008 702/15 |
| 10,185,045 B2* | 1/2019 | Ouzounov | ............. | G01V 9/007 |
| 2019/0120957 A1 | 4/2019 | Herring | | |

FOREIGN PATENT DOCUMENTS

RU     2676235 C1    12/2018

OTHER PUBLICATIONS

Nathan Blaunstein et al.: "Ionosphere and applied aspects of radio communication and radar" Boca Raton, Florida ; London ; New York : CRC Press, 200, ISBN: 978-1-4200-5514-6.
"Pre-Earthquake Processes: A Multidisciplinary Approach to Earthquake Prediction Studies, Geophysical Monograph 234" First Edition, Edited by Dimitar Ouzoounov et al. 2018 American Geophysical Union. Published 2018 by John Wiley and Sons, Inc.
International Search Report of PCT/IB2022/053527 dated Aug. 31, 2022.

* cited by examiner

*Primary Examiner* — Elias Desta
(74) *Attorney, Agent, or Firm* — Mark M. Friedman

(57) ABSTRACT

A method of predicting parameters of an earthquake uses an array of ionosondes to scan an observed volume of an ionosphere located above a seismically active zone. The method includes monitoring ionograms provided by the array of ionosondes; detecting the presence of at least one seismic-induced irregularity (SII); determining a first predicted parameter corresponding to an epicenter location; and determining one or more predicted parameters selected from a group consisting of a magnitude, a time of occurrence, and a hypocenter depth. Algorithms for calculating the predicted parameters are presented in detail.

7 Claims, 8 Drawing Sheets

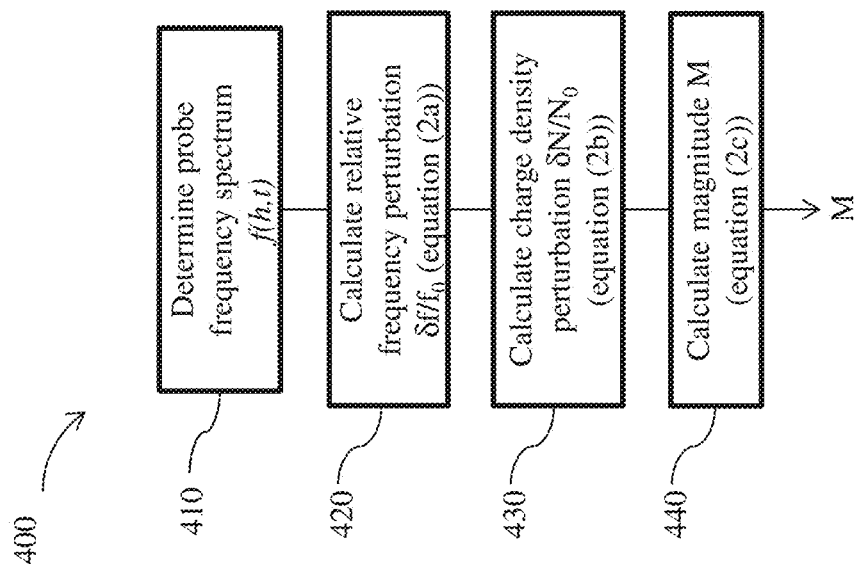

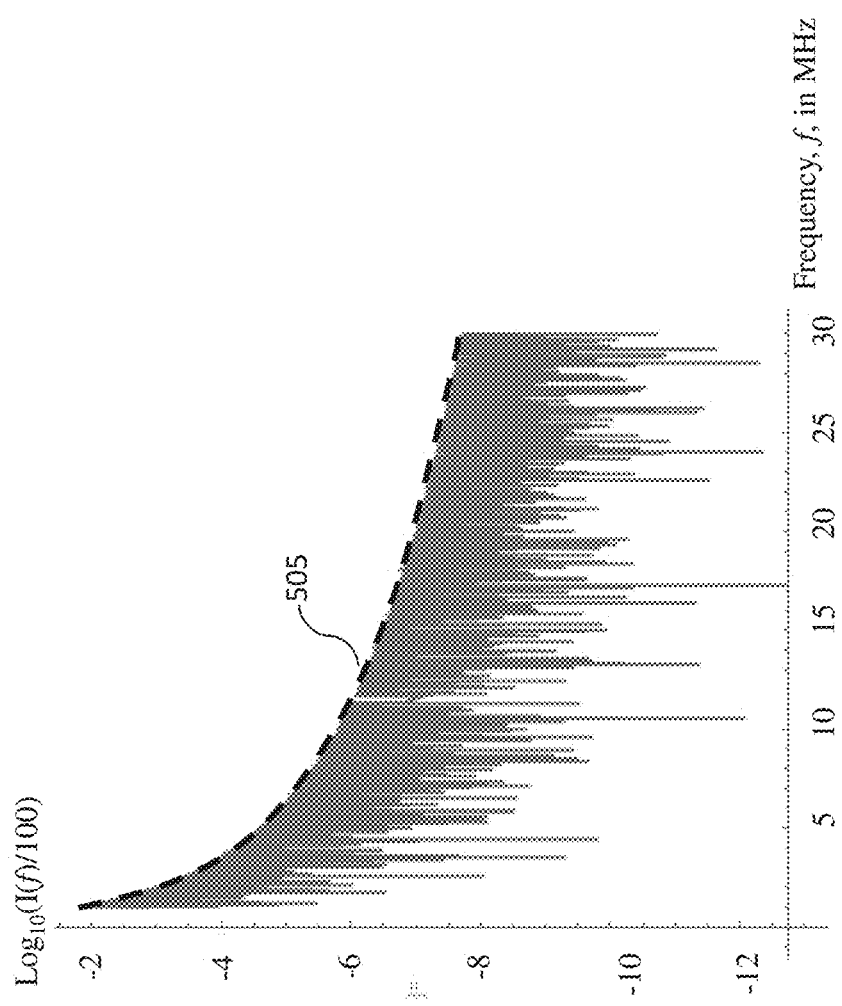

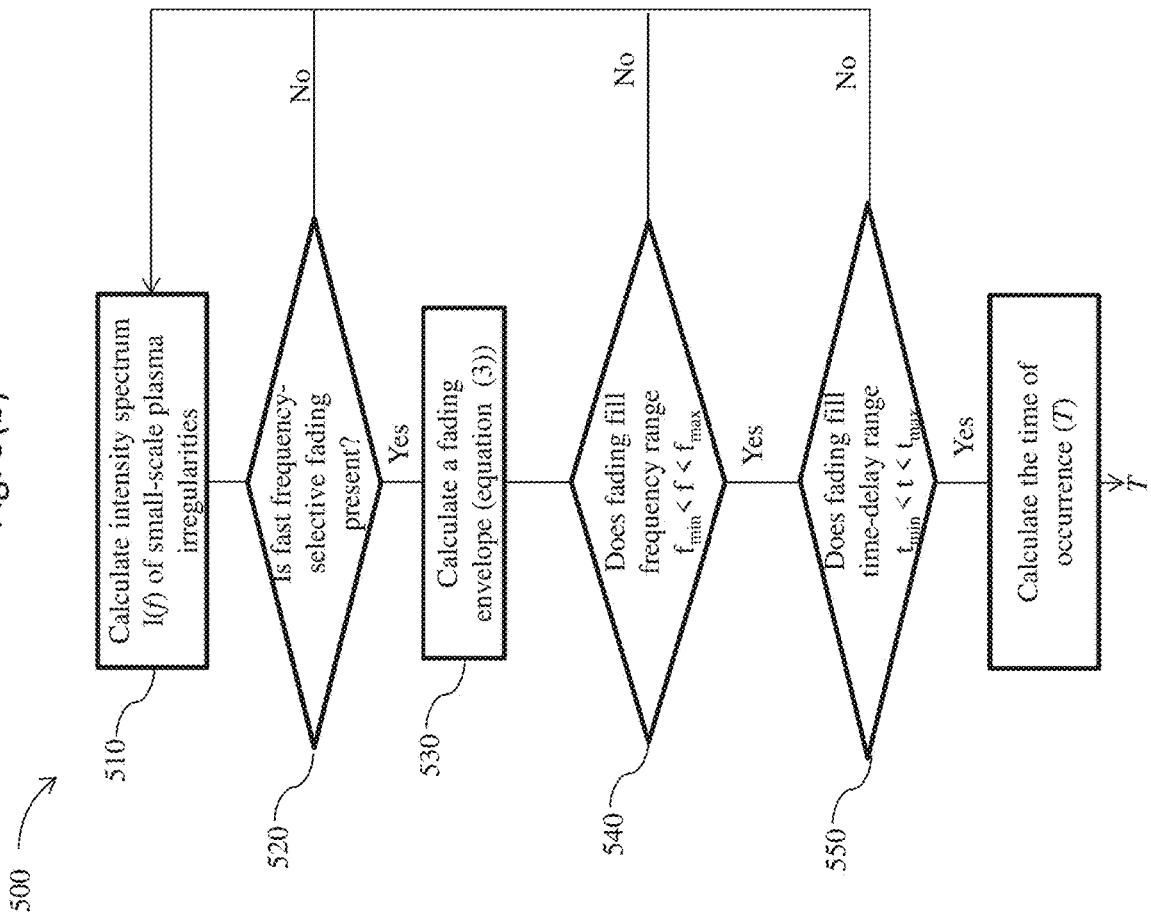

METHOD FOR SHORT-TERM PREDICTION OF EARTHQUAKE PARAMETERS USING IONOSPHERIC PRECURSORS

CROSS-REFERENCE TO RELATED APPLICATIONS

This application is related to and claims priority from commonly owned U.S. Provisional Patent Application No. 63/176,422, entitled "Methodology and Instrumentation for Short-term Forecasting of Precursors of Earthquake based on Synergy of Processes occurring in the Lithosphere-Atmosphere-Ionosphere Circuit", filed on Apr. 19, 2021, the disclosure of which is incorporated by reference in its entirety herein.

TECHNICAL FIELD

The present invention relates to earthquake early warning systems and specifically to a method for short-term prediction of various earthquake parameters using ionospheric precursors.

BACKGROUND OF THE INVENTION

Advance warning of 1-2 days, or even just a few hours, can help to greatly reduce the loss of life and catastrophic destruction caused by an earthquake.

It is known that seismic-induced irregularities (SIIs) or seismic-induced anomalies are present in the ionosphere shortly before the onset of an earthquake. The SIIs are caused by inhomogeneous spatial and time-varying perturbations of the neutral atoms, charged electrons, and charged ions present in the ionospheric plasma. A large body of seismic models have been developed to explain the complex coupling between SIIs and physical processes occurring in the lithosphere, atmosphere, ionosphere, and magnetosphere (LAIM), at different locations on the earth's surface. A comprehensive review of these processes may be found, for example, in N. Blaunstein et al., *Ionosphere and Applied Aspects of Radio Communication and Radar*, Boca Raton, FL: CRC Press, 2008, and in D. Ouzounov et al., *Pre-Earthquake Processes: A Multidisciplinary Approach to Earthquake Prediction Studies*, Wiley, 2018.

U.S. Pat. No. 6,246,964 to N. Blaunstein, dated 12 Jun. 2001, and entitled "Method of Earthquake Prediction" (hereinafter referred to as '964) teaches a method of predicting an earthquake in a seismically active region below an ionosphere, including the steps of measuring a relative fluctuation of plasma density in the ionosphere, inferring a relative amplitude of an acousto-gravity wave in the ionosphere, and inferring an earthquake magnitude from the relative amplitude of the acousto-gravity wave.

U.S. Pat. No. 10,823,864 to D. Ouzounov and S. Pulinets, dated 3 Nov. 2020, and entitled "Earthquake Warning System", discloses an earthquake warning system which includes a ground based platform; remote sensing platforms including a satellite and a plurality of aircraft; one or more processors; and a network communicatively coupled to gas migration devices, air ionization measurement devices, air temperature, relative humidity and pressure sensors, and an ionosphere measurement device.

SUMMARY OF THE INVENTION

For the purposes of this disclosure, the term "hypocenter" denotes the point within the earth where an earthquake rupture starts, and the term "epicenter" denotes the point on the surface of the Earth which is directly above the hypocenter. The term "ionosonde" is used to denote a device which eanbles transmission and reception of radiofrequency (RF) signals to and from the ionosphere, respectively. Ionosonde devices generally include RF transmitters, RF receivers, RF antennas, and signal processors, whose configurations and interconnections are familiar to those skilled in the art of radar.

The present invention discloses a method for determining one or more earthquake parameters, using measurements of ionospheric precursors provided by an array of ionosondes which may be groundbased, airborne, or spaceborne. An example of the latter is an ionosonde mounted on a satellite which is in a geostationary orbit above a seismically active region.

According to one aspect of the presently disclosed subject matter, there is provided a method for predicting parameters of an earthquake using an array of ionosondes to observe a volume of an ionosphere located above a seismically active zone. The method includes monitoring ionograms provided by the array of ionosondes; detecting the presence of at least one SII; determining a first predicted parameter corresponding to an epicenter location; and determining one or more predicted parameters selected from a group consisting of a magnitude, a time of occurrence, and a hypocenter depth.

According to some aspects, the method includes an algorithm for predicting the epicenter location.

According to some aspects, the method includes an algorithm for predicting the magnitude.

According to some aspects, the method includes an algorithm for predicting the time of occurrence.

According to some aspects, the method includes an algorithm for predicting the hypocenter depth.

According to some aspects, the array includes 3 oblique ionosondes and one vertical ionosonde.

According to some aspects, at least one of the oblique ionosondes includes a scanning beam.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 4: A block diagram of an exemplary algorithm for predicting the magnitude.

FIG. 5(a): A plot of an exemplary intensity spectrum I(f) showing fast frequency-selective fading before an earthquake.

FIG. 5(b): A block diagram of an exemplary algorithm for predicting the time of occurrence, based on frequency-selective fading.

DETAILED DESCRIPTION OF THE INVENTION

The principles and operation of earthquake prediction according to the present invention may be better understood with reference to the drawings and the accompanying description.

An ionosonde is a radar that is specially designed to examine the ionosphere. Generally, it includes a radio frequency (RF) transmitter, an RF receiver which automatically tracks the frequency of the RF transmitter, and RF antennas for transmission and reception which may have directional radiation patterns. Typically, the transmitted signal includes a carrier frequency range of 1 to 30 MHz. and some type of modulation, such as linear frequency modulation (LFM), also known as "chirp". One of the outputs of an ionosonde is an ionogram which is a plot of reflected signal intensity versus the transmitted RF frequency on the horizontal axis and the signal delay time, which is proportional to the round-trip signal path length divided by the speed of light, on the vertical axis. In studies of the ionosphere, the reflected signal intensity is proportional to the radar cross section of the inhomogeneous plasma ionization density at different locations within the volume scanned by the ionosonde.

Figure 1:
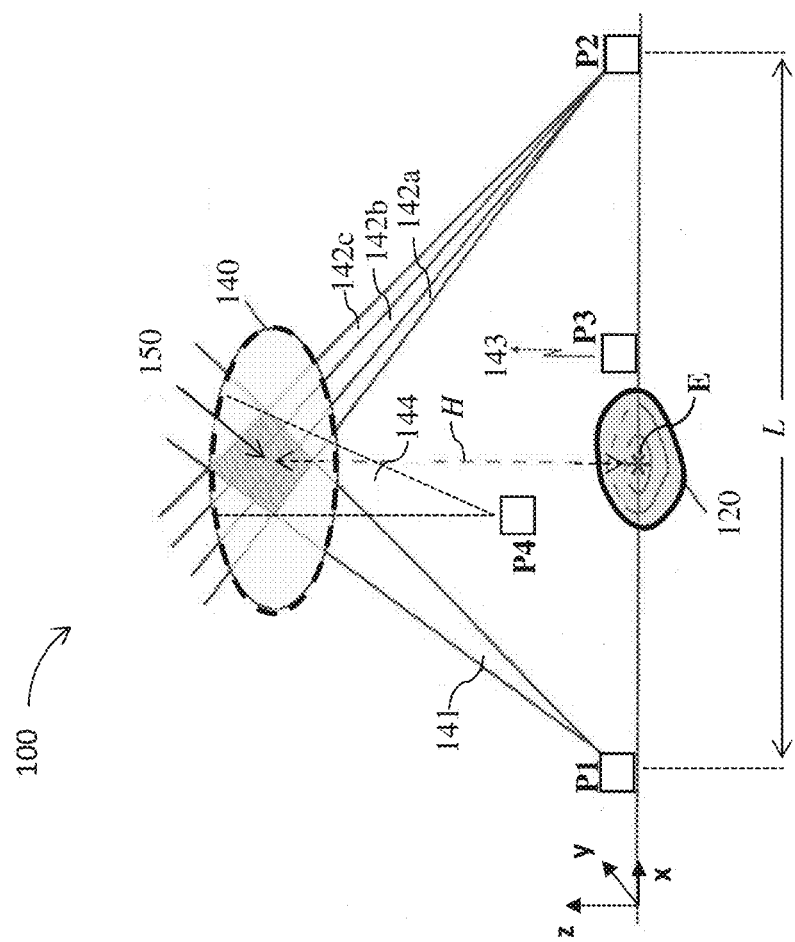
FIG. 1: A schematic of an exemplary ionosonde array for predicting earthquake parameters, according to an embodiment of the invention.

FIG. 1 shows a schematic of an exemplary ionosonde array 100 for predicting earthquake parameters, according to an embodiment of the invention. The array consists of two oblique ionosondes, P1 and P2, one vertical ionosonde P3, and a third oblique ionosonde P4 which enables EL estimation with high accuracy. In the exemplary embodiment of FIG. 1(a), the ionosondes are ground-based, and lie more or less in a horizontal (x-y) plane, for which z=0. However, the principles of the invention are equally applicable to arrays in which one or more of the ionosondes is located above the horizontal plane (z>0), as in the case of airborne or satellite-borne ionosondes.

Earthquakes tend to occur in fault zones, which are linear geological features. The distance L between P1 and P2 is large enough to encompass the seismically active zone 120; typically L is in a range of 200 to 600 kilometers. The epicenter E, whose horizontal location ($x_E$, $y_E$) is yet to be determined, lies somewhere inside the active zone 120.

In one embodiment of array 100, the ionosonde at P1 may transmit (and receive) a continuous wave which is swept in frequency, and which has a relatively broad radiated beam 141. For example, beam 141 may have a beamwidth of 12 degrees to 23 degrees in azimuth and elevation. The ionosonde at P2 transmits (and receives) at the same instantaneous frequency as the one at P1, but uses relatively narrow scanning beams, 142a, 142b, and 142c, which correspond to different scan angles in elevation and/or azimuth. For example, the narrow scanning beams may have a beamwidth of 2 degrees to 6 degrees in azimuth and elevation. The vertical ionosonde P3 transmits (and receives) in a vertical direction 143, which is parallel to the z-axis. The configuration of oblique ionosonde P4 radiating beam 144 may be similar to that of P1 or of P2.

Together, the beams from the four ionosondes P1-P4 illuminate an observed volume 140, at an altitude H above the active zone 120. Inside the observed volume 140 is an SII region 150 which extends from an altitude of about 120 km. to an altitude of about 150 km. The center of SII region 150 is roughly at an altitude $H_0$=135 km., and its horizontal position is directly above the epicenter E. Furthermore, the horizontal dimensions of the SII region 150 are generally stretched in the direction of geomagnetic field lines.

In an alternative embodiment, one or more of the oblique ionosondes of array 100 may be replaced by a dense array of vertical ionosondes arranged to enable complete coverage of the observed volume 140.

Figure 2:
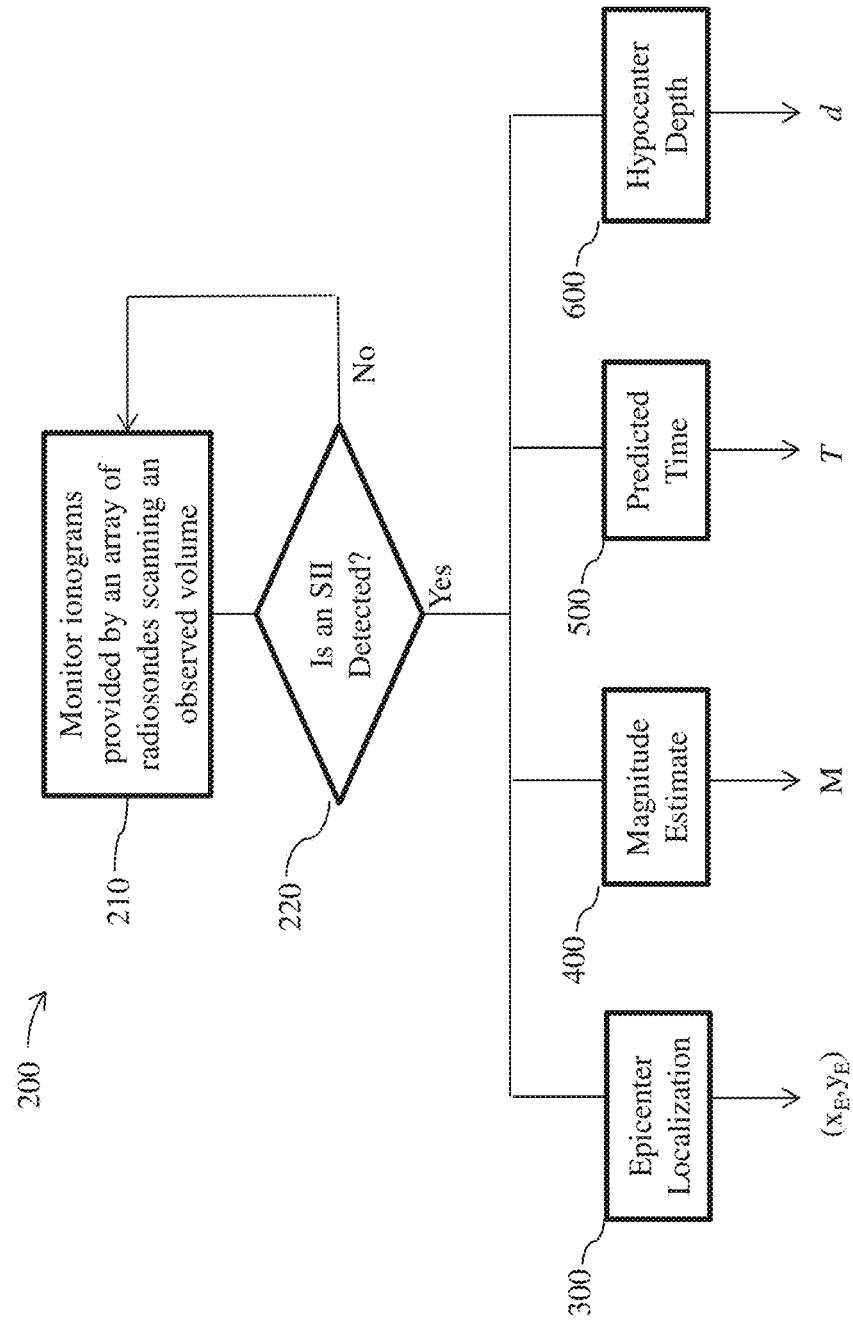
FIG. 2: A block diagram of an exemplary method for predicting four earthquake parameters.

FIG. 2 shows a block diagram of an exemplary method for predicting four earthquake parameters—($x_E$, $y_E$), M, T, and d. The steps of the method are as follows:

210: Monitor ionograms provided by an array of radiosondes scanning an observed volume 140, as illustrated in FIG. 1.

220: Determine if an SII is detected in any of the ionograms, in the form of a high-intensity scattered signal corresponding to a plasma density fluctuation which is localized in the time-frequency domain of the ionogram. If no SII is present, return to step 210. Otherwise, proceed to the following steps.

300: Determine a predicted epicenter location, ($x_E$, $y_E$).

400: Determine a predicted magnitude, M.

500: Determine a predicted time of occurrence, T.

600: Determine a predicted hypocenter depth, d.

The following sections explain the algorithms 300, 400, 500, and 600 in detail.

Epicenter Location

Figure 3A:
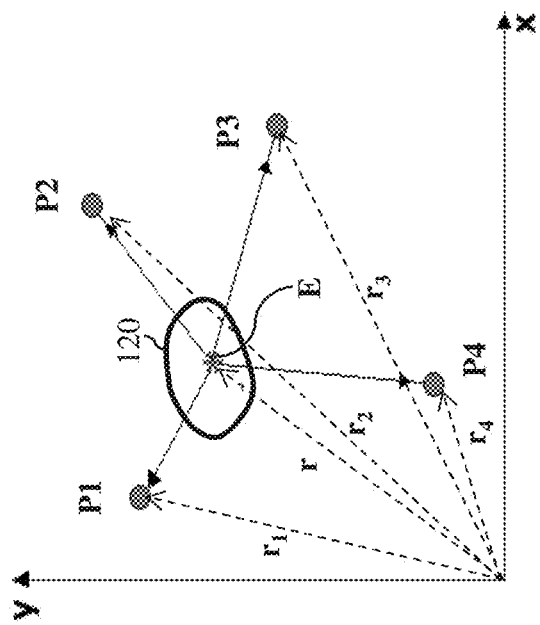
FIG. 3(a): A sketch of a four-point geometry which enables prediction of the epicenter location with a high degree of accuracy.

FIG. 3(a) is a sketch of a four-point geometry which enables prediction of the epicenter location with a high degree of accuracy. The placement of the four ionosondes are shown projected onto the horizontal x-y plane, which contains the epicenter E. From the ionograms measured by the ionosondes P1-P4, an SII inside the volume 150 is detected and its time delay is measured by each of the ionosondes.

Let $r_n$ denote the three dimensional position vector of ionosonde Pn, where n=1, 2, 3, and 4; and let r=[$x_E$, $y_E$, H] denote the position vector of an SII located above the epicenter at [$x_E$, $y_E$, 0]. The time delay (divided by 2) of a radar signal scattered by the SII and received by ionosonde Pn is equal to $t_n=|r-r_n|/c$, where c is the speed of light. Comparing the time delays between pairs of ionosondes, one has:

$$t_{1,2} = \frac{|r-r_1|}{c} - \frac{|r-r_2|}{c} \qquad \text{equation (1a)}$$

$$t_{1,3} = \frac{|r-r_1|}{c} - \frac{|r-r_3|}{c} \qquad \text{equation (1b)}$$

$$t_{1,4} = \frac{|r-r_1|}{c} - \frac{|r-r_4|}{c} \qquad \text{equation (1c)}$$

where $t_{ij}$ denotes the difference between the time delays measured in P1 and Pj (j=2,3,4). The speed of light, c, is equal ($c_0-\delta c$), where $c_0=3\times10^8$ meters/sec is the speed of an electromagnetic wave in vacuum, and $\delta c$ is a speed correction that depends upon the plasma normalized dielectric permittivity (generally denoted as $\varepsilon_r$).

Using an a-priori value for H such as H=$H_0$, equations (1a)-(1c) represent a set of three nonlinear equations involving the three unknowns: $x_E$, $y_E$ and $\delta c$. These equations may be solved by standard numerical techniques, such as Newton-Raphson iteration.

Figure 3B:
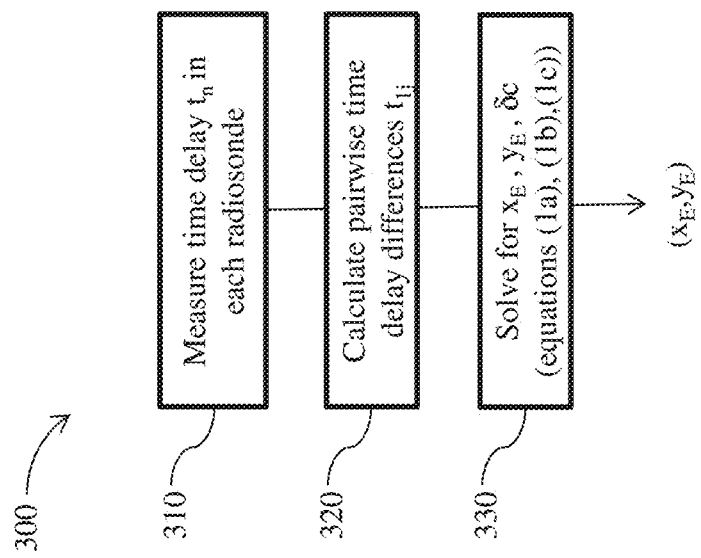
FIG. 3(b): A block diagram of an exemplary algorithm for predicting the epicenter location.

FIG. 3(b) shows a block diagram of an exemplary algorithm 300 for predicting the epicenter location, according to the invention. The algorithm includes the steps:

310: Measure the time delay $t_n$ in each radiosonde.

320: Calculate pairwise time delay differences $t_{ij}=t_1-t_j$ (j=2,3,4).

330: Solve equations (1a), (1b), and (1c) for the values of $x_E$, $y_E$, and $\delta c$, and output $(x_E, y_E)$.

Empirical testing of algorithm 300 has indicated that horizontal position accuracies of less than 2-3 km. are possible using an array of 4 ionosondes, as shown in FIG. 1. This is a significant improvement over the position accuracies that can be achieved using only 3 ionosondes (two oblique and one vertical), which is only about 10-15 km.

In an alternative embodiment of FIG. 1(b) involving more than four ionosondes, one may form more than three pairs of time delay differences $t_{1j}$, leading to a set of more than three independent nonlinear equations for the same three unknowns—$x_E$, $y_E$ and $\delta c$. In this case, an estimate of even higher accuracy may be achieved by applying algorithm 300 to different combinations of three time delay differences and then averaging over the results. For example, if the array 100 includes five ionosondes, there are 4 independent time delay differences $t_{1j}$ (j=2,3,4,5) which may be combined to provide 4 different estimates of $(x_E, y_E)$. The latter may then be averaged to provide a highly accurate prediction of the epicenter location.

Magnitude Estimate

The probe frequency is the maximum frequency which is specularly reflected by the ionosphere, and its value is readily determined from an ionogram by those skilled in the art. Generally, the probe frequency varies with altitude (h) and time (t) according to the relationship:

$$f(h,t)=[e^2N(h,t)/(\varepsilon_0 m_e)]^{1/2}=8.9788[N(h,t)]^{1/2} \quad \text{equation (2a)}$$

where e and $m_e$ are the charge and mass of the electron, $\varepsilon_0$ is the vacuum dielectric permittivity, and N(h,t) is the plasma charge density, i.e. the number of electrons (or ions) per unit volume. In the D-layer to F-layer of the ionosphere, the plasma charge density is typically between $10^{11}$ and $10^{13}$ per cubic meter.

Let $f_0$ and $N_0$ denote the unperturbed probe frequency and charge density measured prior to a seismic event, and $f_1$ and $N_1$ denote the perturbed probe frequency and charge density measured by scattering from an SII during a seismic event. From equation (2a), the charge density perturbation $(\delta N=N_1-N_0)$ of the SII is given by:

$$\delta N/N_0=(f_1/f_0)^2-1=(1+\delta f/f_0)^2-1, \quad \text{equation (2b)}$$

where $\delta f/f_0=(f_1-f_0)/f_0$ is the relative frequency perturbation.

Based upon an electrostatic model of plasma fluctuations caused by seismically induced longitudinal acoustic-gravity waves (AGW), as presented by Blaunstein in '964, the value of $\delta N/N_0$ in equation (2b) is proportional to a relative amplitude, $\delta A$, of low frequency seismic AGWs which, in turn, is proportional to the magnitude (M) of the seismic event, measured in units on the Richter scale. Since $M \propto \delta A \propto \delta N/N_0$, it follows that:

$$M=C(\delta N/N_0) \quad \text{equation (2c)}$$

where C is a constant of proportionality. The constant C has been found to depend upon the composition of the sub-soil crust in the vicinity of the epicenter E and typically ranges from 0.2 to 0.8. Table 1 shows empirically determined values of C, based on investigations carried out at the fault locations shown in the third column.

TABLE 1

Empirical values of the constant C

| Sub-soil crust | C | Fault Location |
|---|---|---|
| hard | 0.2-0.3 | Israel, Cyprus |
| few cracks | 0.5-0.6 | Western Greece, Eastern Turkey |
| many cracks/faults | 0.7-0.9 | Vrancea (Romania) |

It should be noted that solar geomagnetic storms may generate values of $(\delta N/N_0)$ as large as 0.1 which are not caused by an AGW. However, equation (2c) and Table 1 indicate that such storms may produce a maximum value of M=0.9×0.1=0.09, which is too small to be mistaken for a seismic event.

FIG. 4. shows a block diagram of an exemplary algorithm 400 for magnitude estimation using probe frequency perturbations, consisting of the following steps:

410: Determine the probe frequency spectrum f(h,t) vs. altitude (h) and time (t).

420: Calculate relative frequency perturbation $(\delta f/f_0)$ caused by the SII, according to equation (2a).

430: Calculate the charge density perturbation $\delta N/N_0$ according to equation (2b).

440: Calculate an estimate of the magnitude (M) according to equation (2c).

Empirical tests of the magnitude estimation algorithm have been carried out and have shown that earthquake magnitudes are predicted with an uncertainty of approximately 0.5 units on the Richter scale for earthquakes of magnitude M>1.

Predicted Time of Occurrence

One of the most critical earthquake parameters is predicted time of occurrence. If the magnitude M is estimated to be above a predetermined threshold, of say 5, an advance prediction of the time of occurrence enables the people living near the epicenter location to take precautionary measures or even to evacuate the area.

Extensive work by the inventor on ionograms recorded during the earthquakes in the vicinity of Vrancea, Romania, and in other places around the globe, has revealed that a short-term predicted time of occurrence can be found by analyzing fast frequency-selective fading effects in the intensity of scattered RF signals.

FIG. 5(a) is a plot of an exemplary intensity spectrum I(f) showing fast frequency-selective fading before an earthquake. The spectrum is derived from actual ionograms recorded in Vrancea 6 hours before an earthquake of magnitude M=4.8 that occurred in September, 2016. Frequency (f) in MHz is plotted on the horizontal axis and $\log_{10}(I(f)/100)$ is plotted on the vertical axis. Strong and deep deviations of signal intensity are found in the frequency band from 8 to 15-20 MHz.

The dashed line 505 in FIG. 5(a) is the envelope of rapid fluctuations in intensity, and its rate of exponential decrease in the frequency range between 8 and 20 MHz is well described by the frequency-selective fading equation:

$$I(k) = 8\pi \langle (\Delta\Phi)^2 \rangle \frac{L_0}{(1+k^2L_0^2)^{3/2}} \sin^2\left(\frac{1}{2}k^2 d_F^2\right) \quad \text{equation (3)}$$

where $k=2\pi f/c$, and the fitting parameters are $\langle (\Delta\Phi)^2 \rangle = 100$, $L_0=10$ km. and $d_F=1$ km. In some cases, a better fit to I(k) is found by replacing the exponent 3/2 in the denominator by either 1 or 2.

The rapid fluctuations in intensity are believed to be caused by diffractive scattering from many small-scale plasma irregularities in the SII region 150. The size of the plasma irregularities is smaller than the parameter $d_F$, which characterizes the size of the first Fresnel zone of the scattering geometry.

Ionogram recordings indicate that shortly before an earthquake, small-scale plasma irregularities fill the entire frequency range $f_{min} < f < f_{max}$ of I(f), where typically $f_{min}$=8 MHz and $f_{max}$ is between 15 and 20 MHz, depending on the magnitude M of the seismic event. In addition, small-scale plasma irregularities are present throughout a time-delay range of $t_{min} < t < t_{max}$, where typically $t_{min}$=3 milliseconds and $t_{max}$=5.5 milliseconds. These markers in frequency and time-delay are indicative of an impending earthquake whose time of occurrence T is estimated to be 6 to 8 hours from the observed time $T_0$ at which small-scale plasma irregularities fill the above ranges in frequency and time-delay.

FIG. 5(b) shows a block diagram of an exemplary algorithm 500 for predicting time of occurrence, based on fast frequency-selective fading. The algorithm consists of the steps:

510: Calculate the intensity spectrum I(f) of small-scale plasma irregularities.
520: Determine if fast frequency-selective fading is present in I(f). If not, return to step 510.
530: Calculate a fading envelope 505 of I(f), according to equation (3).
540: Determine if fading fills the frequency range $f_{min} < f < f_{max}$. If not, return to step 510.
550: Determine if fading fills the altitude range $H_{min} < H < H_{max}$. If not, return to step 510.
560: Calculate a predicted time of occurrence T.

Empirical tests of the algorithm 500 have been carried out and have shown that the predicted time estimate has an uncertainty of approximately 0.5 hours.

Hypocenter Depth

Extensive investigation of ionograms from major seismic events has indicated that there is an approximately linear relationship between the seismic intensity measured above the epicenter ($I_E$), the value of M, and the value of $\log_{10}(d)$, where d is the hypocenter depth in km.

An estimate for d is found by first calculating M using algorithm 400, and then solving one of the equations:

For $1 \leq M \leq 3$: $I_E = C_1(d) + C_2(d) \log_{10} d + 1.62 M$  equation (4a)

For $M > 3$: $I_E = C_3(d) + C_4(d) \log_{10} d + 1.35 M$  equation (4b)

where the coefficients are different for shallow and deep seismic events, as shown in Table 2 below.

TABLE 2

| | Coefficients $C_1$-$C_4$ | | | |
|---|---|---|---|---|
| | $C_1$ | $C_2$ | $C_3$ | $C_4$ |
| d ≤ 75 km | 6.9 | −3.8 | 8.0 | −3.1 |
| d > 75 km | 7.8 | −3.8 | 8.9 | −3.1 |

Figure 6:
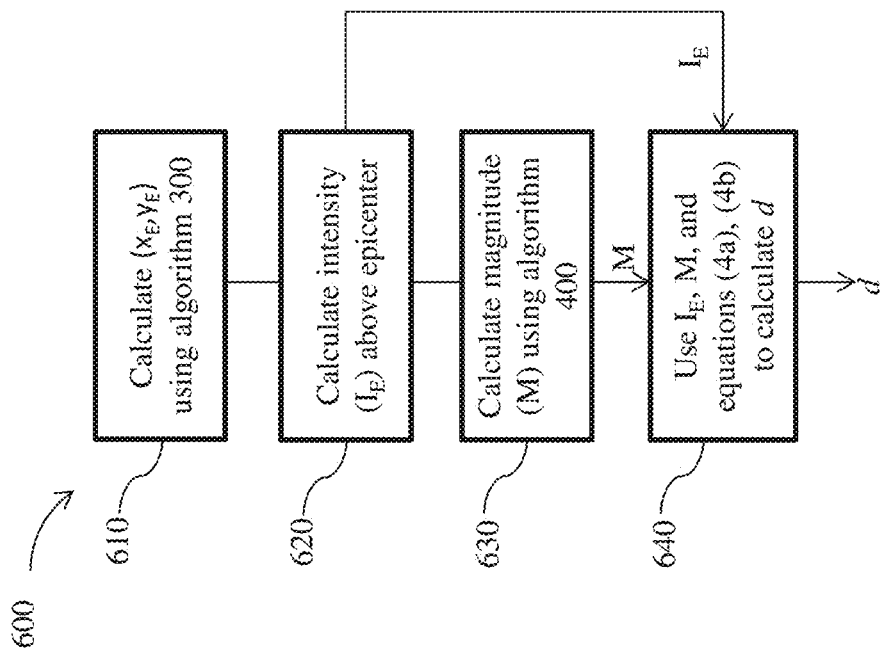
FIG. 6: A block diagram of an exemplary algorithm for predicting the hypocenter depth.

FIG. 6 shows a block diagram of an exemplary algorithm 600 for estimating hypocenter depth (d), consisting of the steps:

610: Calculate the predicted epicenter location ($x_E, y_E$) using algorithm 300.
620: Calculate intensity ($I_E$) above the epicenter.
630: Calculate the predicted magnitude (M) using algorithm 400.
640: Use $I_E$, M, and equations (4a) and (4b) to calculate, and output, the predicted hypocenter depth (d).

Empirical testing of algorithm 600 has indicated that that the predicted depth d has an accuracy of approximately 0.5 km.

The above algorithms for predicting the earthquake parameters of epicenter location, magnitude, time of occurrence, and hypocenter depth using ionospheric precursors have been tested and found to apply to earthquakes all over the globe—from the equator to the polar caps, for different continents and undersea seismic events, and for various meridians and latitudes across the Earth. Furthermore, the accurate prediction of hypocenter depth and epicenter location is of great importance in predicting the occurrence and magnitude of tsunamis.

In general, the descriptions of the various embodiments of the present disclosure have been presented for purposes of illustration, but are not intended to be exhaustive or limited to the embodiments disclosed. Many other modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of predicting parameters of an earthquake using an array of ionosondes to scan an observed volume of an ionosphere located above a seismically active zone, the method comprising:
    (a) monitoring ionograms provided by the array of ionosondes;
    (b) detecting the presence of at least one Seismic-Induced Irregularity (SII);
    (c) determining a first predicted parameter corresponding to an epicenter location; and
    (d) determining one or more predicted parameters selected from a group consisting of a magnitude, a time of occurrence, and a hypocenter depth.

2. The method of claim 1 comprising an algorithm for predicting the epicenter location which includes the steps:
    measuring a time delay in each of at least four radiosondes;
    calculating at least three pairwise time delay differences; and
    solving a system of three nonlinear equations to determine the epicenter location, ($x_E, y_E$).

3. The method of claim 1 comprising an algorithm for predicting the magnitude which includes the steps:
    determining a probe frequency spectrum (f(h,t));
    calculating a relative frequency perturbation ($\delta f/f_0$);
    calculating a charge density perturbation ($\delta N/N_0$); and
    calculating the magnitude (M), as equal to the product of an empirical constant (C) and the charge density perturbation.

4. The method of claim 1 comprising an algorithm for predicting the time of occurrence which includes the steps:
    calculating an intensity spectrum (I(f)) of small-scale plasma irregularities;
    determining whether fast frequency-selective fading is present in I(f), and, if not, returning to the step of calculating the intensity spectrum;
    calculating a fading envelope of I(f);
    determining if fading fills a frequency range extending from a predetermined minimum frequency value ($f_{min}$)

to a predetermined maximum frequency value ($f_{max}$), and, if not, returning to the step of calculating the intensity spectrum;

determining if fading fills an altitude range extending from a predetermined minimum altitude value ($H_{min}$) to a predetermined maximum altitude value ($H_{max}$), and, if not, returning to the step of calculating the intensity spectrum; and calculating the time of occurrence (T).

5. The method of claim 1 comprising an algorithm for predicting the hypocenter depth which includes the steps:

calculating the epicenter location ($x_E, y_E$) using an algorithm which includes the steps of measuring a time delay in each of at least four radiosondes, calculating at least three pairwise time delay differences, and solving a system of three nonlinear equations to determine the epicenter location, ($x_E, y_E$);

calculating an intensity ($I_E$) above the epicenter location;

calculating the magnitude (M) using an algorithm for predicting the magnitude which includes the steps of determining a probe frequency spectrum (f(h,t)), calculating a relative frequency perturbation ($\delta f/f_0$), calculating a charge density perturbation ($\delta N/N_0$), and calculating the magnitude (M), as equal to the product of an empirical constant (C) and the charge density perturbation; and using $I_E$, M, and the equations for: $1 \le M \le 3$: $I_E = C_1(d) + C_2(d)\log_{10} d + 1.62M$, and for $M > 3$: $I_E = C_3(d) + C_4(d)\log_{10} d + 1.35M$, with the coefficients of the equations being different for shallow and deep seismic events to calculate the hypocenter depth (d).

6. The method of claim 1 wherein the array comprises 3 oblique ionosondes and one vertical ionosonde.

7. The method of claim 6 wherein at least one of the oblique ionosondes comprises a scanning beam.

* * * * *